US012179491B2

(12) United States Patent
Alvarez Tapia et al.

(10) Patent No.: US 12,179,491 B2
(45) Date of Patent: Dec. 31, 2024

(54) CAPPING STATIONS WITH POSITIONING MECHANISMS

(71) Applicant: Hewlett-Packard Development Company, L.P., Spring, TX (US)

(72) Inventors: Jose Antonio Alvarez Tapia, Sant Cugat del Valles (ES); Emilio Angulo Navarro, Sant Cugat del Valles (ES); Diego Lopez Ubieto, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 126 days.

(21) Appl. No.: 17/999,256

(22) PCT Filed: May 19, 2020

(86) PCT No.: PCT/US2020/033593

§ 371 (c)(1),
(2) Date: Nov. 18, 2022

(87) PCT Pub. No.: WO2021/236065

PCT Pub. Date: Nov. 25, 2021

(65) Prior Publication Data

US 2023/0211608 A1 Jul. 6, 2023

(51) Int. Cl.
*B41J 2/165* (2006.01)

(52) U.S. Cl.
CPC .................................. *B41J 2/16511* (2013.01)

(58) Field of Classification Search
CPC .......................... B41J 2/16511; B41J 2/16508
See application file for complete search history.

(56) References Cited

U.S. PATENT DOCUMENTS

| | | | | |
|---|---|---|---|---|
| 5,325,111 | A | 6/1994 | Dietl | |
| 5,339,102 | A | 8/1994 | Carlotta | |
| 5,953,024 | A | 9/1999 | Lee et al. | |
| 6,293,648 | B1 | 9/2001 | Anderson | |
| 6,398,339 | B1 * | 6/2002 | Berg | B41J 2/16523 347/32 |
| 6,520,621 | B1 | 2/2003 | Eckard et al. | |
| 6,568,787 | B1 | 5/2003 | Girones et al. | |
| 7,708,374 | B2 | 5/2010 | Ha | |
| 8,794,738 | B2 | 8/2014 | Katoh et al. | |
| 2007/0103504 | A1 | 5/2007 | Huang | |
| 2018/0229504 | A1 | 8/2018 | Fukunaga et al. | |

FOREIGN PATENT DOCUMENTS

| | | | |
|---|---|---|---|
| CN | 1155687 | A | 7/1997 |
| CN | 108481910 | A | 9/2018 |
| JP | 2005-088217 | A | 4/2005 |
| JP | 2005-199606 | A | 7/2005 |

* cited by examiner

*Primary Examiner* — Thinh H Nguyen
(74) *Attorney, Agent, or Firm* — Jordan IP Law, LLC

(57) ABSTRACT

Examples relate to capping stations having caps with positioning mechanism. The capping station for a printing system may comprise a cap to seal a printhead and a positioning mechanism to move the cap between a first cap position and a second cap position.

14 Claims, 7 Drawing Sheets

CAPPING STATIONS WITH POSITIONING MECHANISMS

BACKGROUND

A printing system may include a pen or a printhead with a plurality of nozzles that deliver print agent onto a print medium so as to print an image. The printing system may comprise a capping station to seal the nozzles of the printhead from contaminants and drying during non-printing periods.

BRIEF DESCRIPTION OF THE DRAWINGS

Various example features will be apparent from the detailed description which follows, taken in conjunction with the accompanying drawings, wherein.

DETAILED DESCRIPTION

Figure 1:
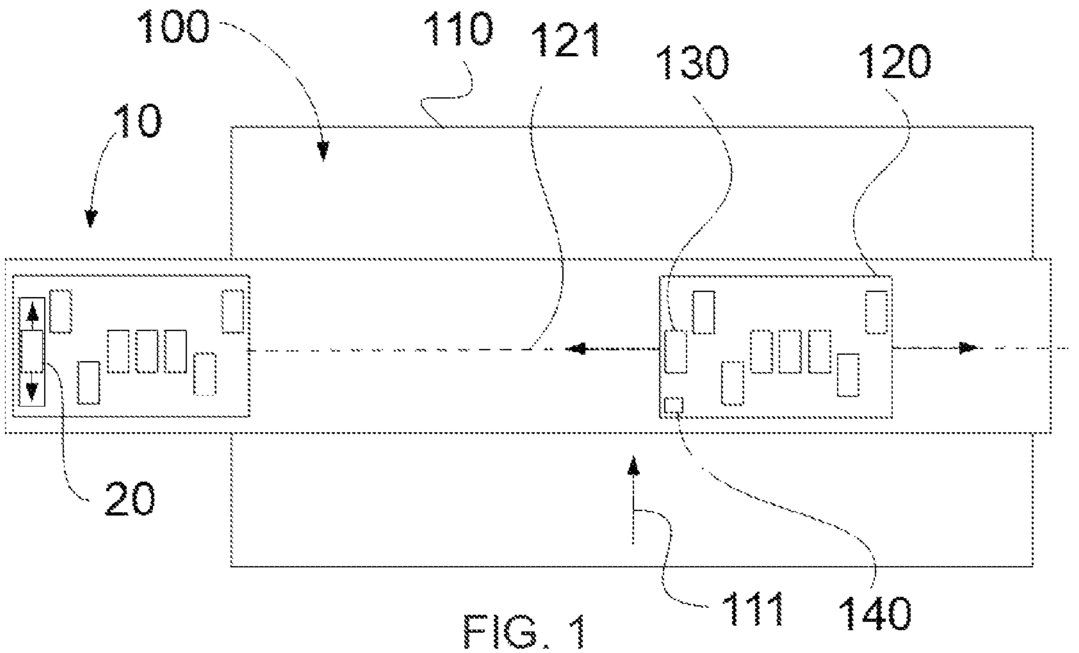
FIG. 1 schematically illustrates a printing system according to an example of the present disclosure.

FIG. 1 schematically illustrates a printing system according to an example of the present disclosure. The printing system 100 comprises a print medium advance system (not shown in FIG. 1) to transport a print medium 110 in a print medium advance direction 111 and printhead support 120 supporting a printhead 130 to deliver a print agent onto the print medium 110.

The printhead 130 may be provided with a plurality of nozzles to deliver print agent, e.g. ink, onto the print medium 110 so as to print an image. During printing, dots of print agent may be precisely delivered onto the print medium 110. In this disclosure, delivering print agent on a print medium includes firing, ejecting, spitting or otherwise depositing print agent onto the print medium. The printhead may comprise a print agent chamber containing print agent to be delivered onto the print medium.

In some examples, a heating element may cause a rapid vaporization of print agent in a print agent chamber, increasing an internal pressure inside this print agent chamber. This increase in pressure makes a drop of print agent exit from the print agent chamber to the print medium through a nozzle. These printing systems may be called as thermal inkjet printing systems.

In some examples, a piezo electric may be used to force a drop of print agent to be delivered from a print agent chamber onto the print medium through a nozzle. A voltage may be applied to the piezo electric, which may change its shape. This change of shape may force a drop of print agent to exit through the nozzle. These printing systems may be called as piezo electric printing systems.

In the example of FIG. 1, the printhead support 120 supports several printheads 130, e.g. eight printheads. The printhead support 120 of this example comprises a carriage for moving the printheads across the scan axis 121. The printheads of this figure may travel repeatedly across the scan axis 121 for delivering print agent onto the print medium 110 which may advance along the print medium advance direction 111. The scan axis 121 may be substantially perpendicular to the print medium advance direction 111. The scan axis may be substantially parallel to print medium width direction. In some examples, four printheads may be mounted on a single printhead support. In some examples, a single printhead may be mounted on a printhead support.

In some examples, the printhead support may be static. The printhead support may comprise a print bar. The print bar may extend along a width of a print medium. The print bar may comprise a printhead or a plurality of printheads. The plurality of nozzles may be distributed within the printhead or the plurality of printheads along the width of the print medium. The width of the print bar may be substantially perpendicular to the print medium advance direction. Such an arrangement may allow most of the width of the print medium to be printed simultaneously. These printer systems may be called as page-wide array (PWA) printer systems.

The print medium 110 may advance or move along the print medium advance direction 111. The print medium may be moved by an advancing system (not shown in FIG. 1). An advancing system may include a roller, a belt system and/or a wheel. The print medium 110 may be of any shape or size to be used in the printing system. In some examples, the advancing system may comprise a print medium feed mechanism for feeding print medium to a print zone.

In some examples, the advancing system may comprise a print medium support to support the print medium to receive the print agent delivered by the printheads. The print medium support may guide and support the print medium in the print zone during printing.

The print medium is a material capable of receiving print agent, e.g. ink. The print medium may comprise paper, cardboard, cardstock, textile material or plastic material. The print medium may be a sheet, e.g. a sheet of paper or a sheet of cardboard.

The printing system 100 of this figure comprises a capping station 10 comprising a series of caps, e.g., a cap for each of the printheads wherein a cap 20 is to seal a printhead and a positioning mechanism to move the cap 20 between a first cap position and a second cap position. This cap may be displaced to engage a printhead. The capping station may seal a printhead to prevent fluid flow therethrough and to prevent print agent from drying within the nozzles. Nozzles may thus be kept healthy and ready to print. The cap may engage the printhead when printing operations are not underway. The cap or the printhead may be moved to unseal the printhead when printing operations are to begin.

The capping station may comprise a cap carriage to support a cap. The positioning mechanism may slide the cap carriage on a guide channel between a first cap position and a second cap position in a direction parallel to the print medium advance direction and may selectively lock the cap carriage at the first cap position and at the second cap position.

In this example, the capping station 10 comprises a plurality of caps to seal the printheads 130 mounted on the printhead support 130. In this figure, the capping station 10 comprises eight caps to seal eight printheads. In this figure, the cap 20 may be moved in a direction parallel to the print medium advance direction 111.

In some examples, a cap 20 from a plurality of caps of a capping station may be moved in a direction parallel to the print medium advance direction 111. In this disclosure, caps mounted in cap carriage movable in a direction parallel to the print medium advance direction 111 may be called movable caps or slidable caps. Remaining caps may be maintained in a fixed position. These caps may be called fixed caps. In some examples, a several caps, e.g. two caps, may be moved in a direction parallel to the print medium advance direction to seal a printhead. In some examples, the plurality of caps may be displaced in a direction parallel to the print medium advance direction to position the caps below the printheads supported by the printhead support.

In some examples, the printing system may comprise a displacing member to relative move one of the printhead support and the capping station to the other of the printhead support and the capping station.

In some examples, the displacing member may move the printhead support towards the capping station to align a cap and a printhead, e.g. position a printhead above a cap. The printhead support may comprise a carriage to move a printhead across the scan axis towards the capping station. The displacing member may comprise the carriage of the printhead support. In this example, the printhead support 120 may be displaced across the scan axis 121 towards the capping station. The printhead support 120 may thus position the printheads above the capping station. The caps of the capping station may thus engage the printheads. Nozzles of the printheads may thus be sealed.

In some examples, the displacing member may move the capping station towards the printhead support to align a cap and a printhead. In page-wide array printer systems, the capping station may be moved towards the print bar. For example, the print bar may be retracted from a print zone and the capping station may rotate towards the print bar in the retracted position.

The printing system of this figure comprises a sensor system 140 mounted at the printhead support 120. The sensor system of this figure may thus be moved towards the capping station together with the printhead support. The sensor system 140 may detect the position of the cap 20. In some examples, a sensor system to detect the position of the cap in a print medium advance direction may be mounted at the capping station. For example, the capping station may comprise switches to detect the position of the cap.

Figure 2A:
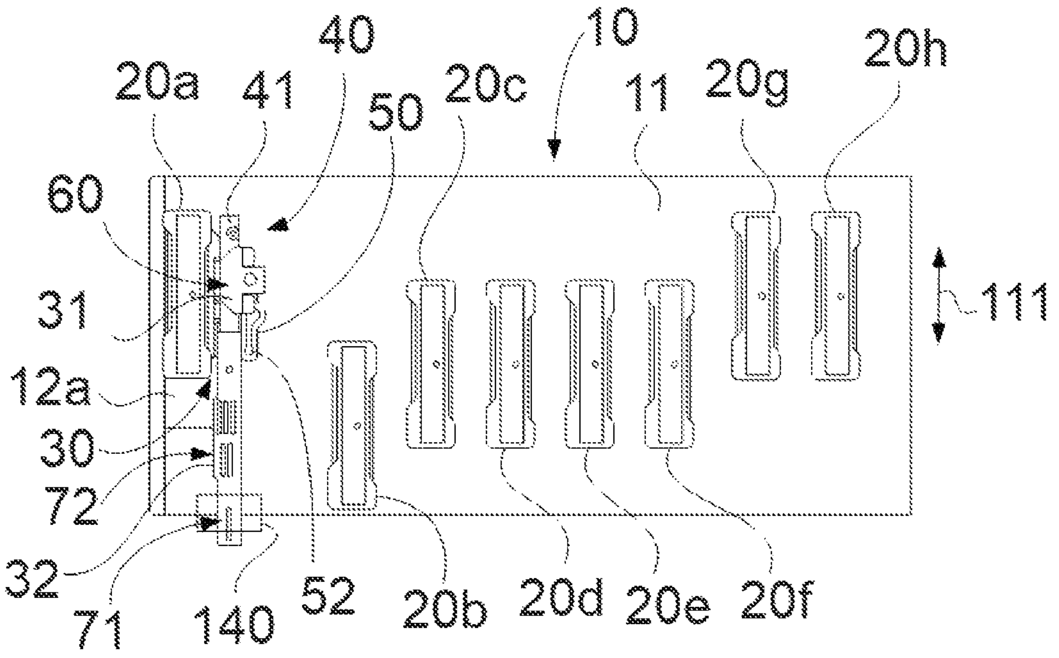
FIGS. 2*a* and 2*b* respectively illustrates a capping station having a cap in a first cap position and in a second cap position according to an example of the present disclosure.
Figure 2B:
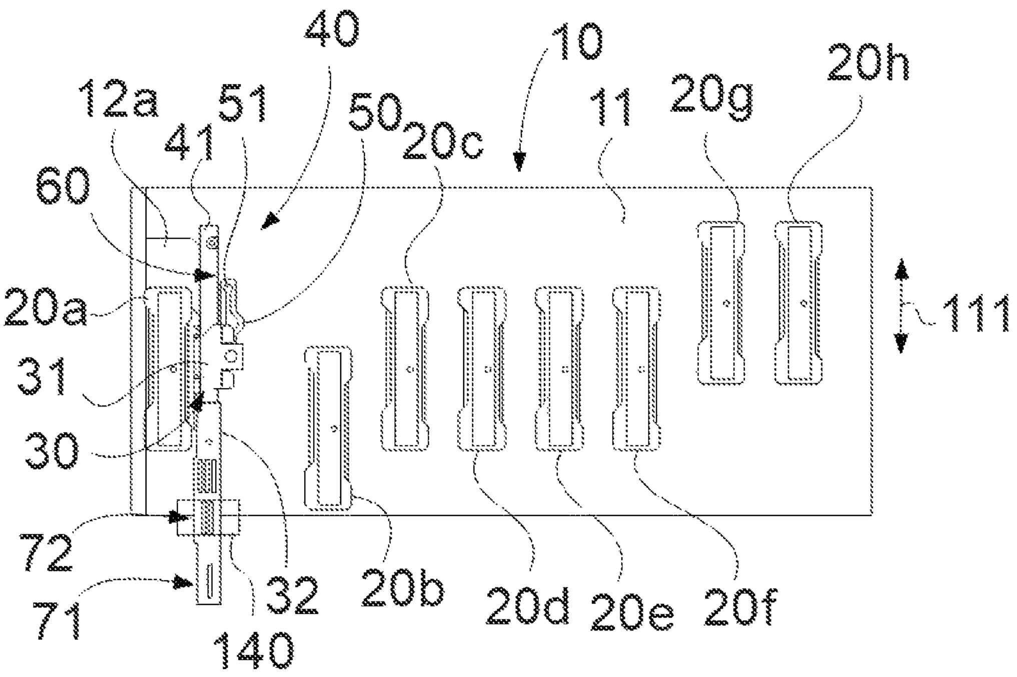

FIGS. 2*a* and 2*b* respectively illustrates a capping station having a cap in a first cap position and in a second cap position according to an example of the present disclosure. These figures illustrate a capping station 10 for a printing system comprising a cap 20*a* to seal a printhead and a cap carriage 30 to support the cap 20*a*. In these figures, the capping station 10 further comprises a positioning mechanism 40 to slide the cap carriage 30 on a guide channel 50 between a first cap position (FIG. 2*a*) and a second cap position (FIG. 2*b*) in a direction parallel to a print medium advance direction 111 and to selectively lock the cap carriage 30 at the first cap position and at the second cap position. The cap carriage and the cap may thus be moved together across the guide channel.

The cap 20*a* may thus be positioned at several positions in a direction parallel to a print medium advance direction 111 in a compact and simple manner. A printhead having several positions may thus be sealed with the cap 20*a*. As the cap carriage may slide along the guide channel, movements in a direction perpendicular to the print medium advance direction may be limited. Precision of the position of the cap may consequently be enhanced.

The capping station 10 of these figures comprises a plurality of caps 20*a-h*. In this example, the caps 20*b-h* are coupled to a support plate 11 of the capping station 10. The caps 20*b-h* may be fitted in openings of the support plate 11. For example, the caps 20*b-h* may snap into these openings. However, the cap 20*a* may be moved along the opening 12*a* of the support plate 11. In some examples, a plurality of caps may be moved in a direction parallel to the print medium advance direction. The cap 20*a* may thus be a movable cap or slidable cap and the caps 20*b-h* fixed caps.

In these figures, the positioning mechanism comprises a locking mechanism 60 to slidable coupling the cap carriage 30 to the guide channel 50. The locking mechanism 60 may lock the cap carriage 30 at the first cap position (FIG. 2*a*) or at the second cap position (FIG. 2*b*). The locking mechanism 60 may allow the cap carriage 30 to slide along the guide channel 50.

In some examples, the locking mechanism may comprise a locking element movable between a locking position to engage the guide channel to lock the cap carriage to the guide channel and a sliding position to slide on the guide channel.

In this example, the cap carriage 30 comprises a bracket 31. The cap carriage may comprise a base receiving the cap and a bracket extending from the base towards the guide channel. The locking mechanism may be coupled to the bracket. The locking element may be displaced relative to the bracket, e.g. between a locking position and a sliding position.

The positioning mechanism 40 of this example comprises a guiding bar 41 extending in a direction parallel to the print medium advance direction 111 engaging the bracket 31 to guide the cap carriage 30. The guiding bar 41 may be attached, e.g. fastened, to the support plate 11. Misalignments of the cap carriage may thus be prevented. Accordingly, the cap may be precisely displaced across the guide channel and positioned at a predetermined position, e.g. at a first cap position or at a second cap position. The guiding bar may guide the cap carriage, e.g. the bracket. For example, a pin protruding from the bracket may slide along a groove formed in the guiding bar.

In some examples, the bracket may comprise a U-shaped beam partially enclosing the guiding bar. The guiding bar may comprise a shape substantially corresponding the U-shaped beam. For example, the guiding bar may comprise a rectangular cross-section to engage the U-shaped of beam. The U-shaped beam may comprise a base and a pair of sidewalls partially enclosing the guiding bar. The U-shaped beam may thus cover the guiding bar. This may protect the guiding bar against dirt and print agent when a printhead is above the cap. In some examples, the U-shaped beam may thus slide along the guiding bar.

In these figures, the guide channel 50 comprises a length extending between a first end to a second end. The guide channel may comprise a width extending perpendicular to the length. The guide channel may comprise a plurality of receivers to accommodate a locking element of the locking mechanism for locking the cap carriage at predetermined positions. In these figures, the guide channel 50 comprises a first receiver 51 and a second receiver 52. In FIG. 2*a*, a locking element is fitted into the first receiver 51 to lock the cap carriage 30 at the first cap position. In FIG. 2*b*, the locking element is fitted into the second receiver 52 to lock the cap carriage 30 at the second cap position. In these examples, the first receiver 51 is at the first end and the second receiver 52 is at the second end of guide channel. The first receiver 51 and the second receiver 52 may comprise a width greater than the width of guide channel. The receivers may be substantially circular. In some examples, the width may be substantially constant along the length of the guiding channel.

In these figures, the guide channel 50 is attached to the support plate 11, e.g. the guide channel is snapped into a groove of the support plate. The support plate and the guide channel may be made from different materials. The guide channel may comprise a low friction material to reduce frictional resistance. From example, the support plate may comprise steel and the guide channel may comprise plastic.

In some examples, the guide channel may be perforated into the support plate. The guide channel may thus be integrated within the support plate.

In these figures, the cap carriage 30 comprises a first identification feature 71 and a second identification feature 72 to respectively indicate that the cap carriage is at the first cap position or at the second cap position. The cap carriage 30 of these figures comprises a cap carriage bar 32 extending in a direction parallel to the print medium advance direction that comprises the first identification feature 71 and the second identification feature 72. In these examples, the first identification feature 71 comprises an opening and the second identification feature 72 comprises a pair of openings.

In some examples, the cap carriage bar may extend from the bracket. For example, the cap carriage bar may extend from the U-shaped beam of the bracket. The cap carriage bar may comprise a U-shape. In some examples a portion of the cap carriage bar may be guided by the guiding bar attached to the support plate.

A sensor 140 may detect these identification features. The first identification feature 71 may be associated with the first cap position (FIG. 2*a*) and the second identification feature 72 may be associated with the second cap position (FIG. 2*b*). Accordingly, when the sensor 140 detects the first identification feature 71, the first cap position may be determined. And when the sensor 140 detects the second identification feature 72, the second cap position may be determined.

In these figures, the sensor 140 is above the cap carriage bar 32 comprising the identification features. For example, the sensor may be attached to the support plate 11 of the capping station 10, e.g. through a sensor support structure. In some examples, the sensor may be below or at a side of the cap carriage bar. In some examples, the sensor may be mounted at a printhead support.

In some examples, the sensor may be an image sensor, e.g. a camera. In some examples, the sensor may comprise an optical sensor. The optical sensor may comprise an emitter and a receiver. The emitter may comprise a light source to irradiate the cap carriage bar.

In some examples, an optical sensor may comprise a light source and a receiver at opposite sides of the cap carriage bar. The light source may project a light beam onto the receiver. For example, the light source may be above the cap carriage bar and the receiver below the cap carriage bar. The cap carriage bar and the optical sensor may be moved relative to each other. Light received by the receiver may vary depending on the elements therebetween. Accordingly, light received by the receiver may be different when a first identification feature having an opening is between the light source and the receiver to when a second identification feature having a pair of openings is between the light source and the receiver.

In some examples, the receiver may be adjacent or integrated within the light source. The receiver may receive light reflected back. Light emitted by the light source may be reflected by the cap carriage bar to the receiver. Light reflected when the openings of the identification features are irradiated by the light source may be lower than when the emitter irradiates the cap carriage bar. Accordingly, the sensor system may determine at which identification features is irradiating the light source.

In some examples, the optical sensor may be mounted at a scan-axis printhead support, i.e. a printhead support of a scan-axis printing system. The sensor system may comprise line sensor to calibrate a printhead. The line sensor may be an optical line sensor. The line sensor may be used for detecting the position of the cap. The line sensor may comprise an emitter with a light source to selectively irradiate print agent on a print medium, e.g. to calibrate a printhead, and the identification features. The line sensor may comprise a receiver to receive light reflected back. The receiver may receive light reflected back by the print agent deposited on a print medium to calibrate a printhead in a calibration process and light reflected back by the cap carriage bar when the printhead support is above the cap carriage bar.

In some examples, the sensor system may comprise a plurality of switches. The plurality of switches may in the opening of the support plate or adjacent to the opening of the support plate. In some examples, a plurality of switches may be contacted by a plurality of identification features in the cap carriage. Each of switches of the plurality of switches may be associated with one cap position of a plurality of cap positions. The plurality of switches may thus detect the position of the cap.

In some examples, a controller may receive data from the sensor and may determine the position of the cap, e.g. if the cap is at the first cap position or at the second cap position. The controller may be a dedicated controller to control the position of the cap or a controller of the printing system to control the operation of the printing system.

The capping station may comprise a lifting system to lift a cap to engage a printhead. In some examples, the lifting system may lift a plurality caps of the capping station. For example, the lifting system may lift the support plate. The cap or the plurality of caps may engage a printhead or a plurality of printheads mounted in a printhead support.

Figure 3A:
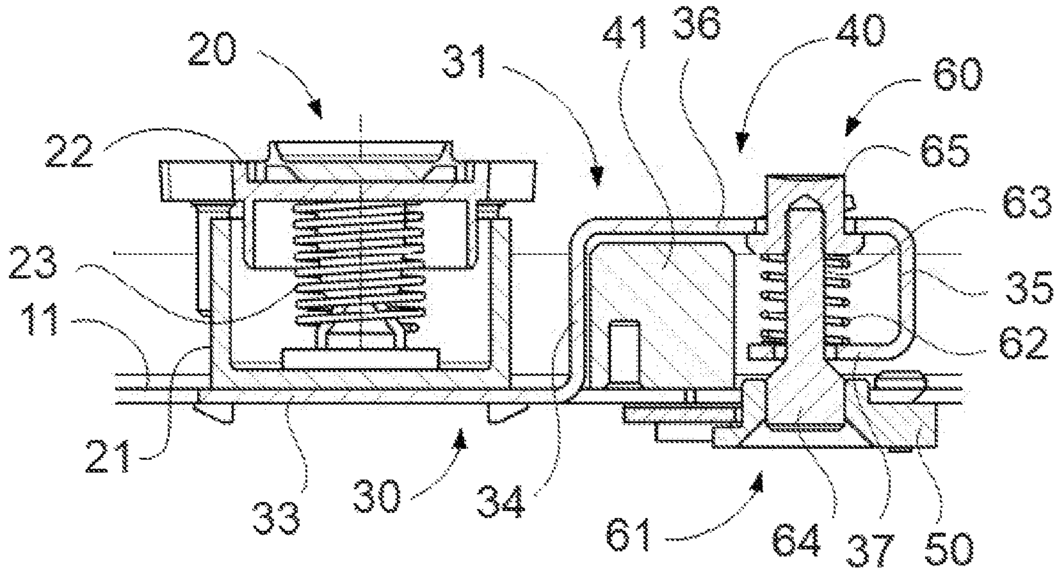
FIGS. 3*a* and 3*b* respectively illustrates a cross-sectional view of a cap carriage locked to a guiding channel and sliding across the guiding channel according to an example of the present disclosure.
Figure 3B:
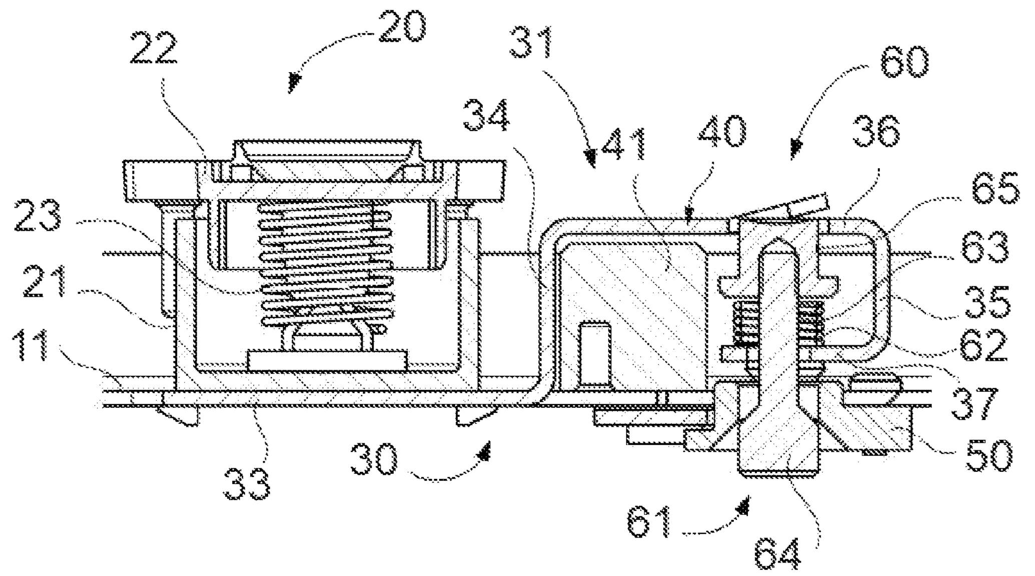

FIGS. 3*a* and 3*b* respectively illustrates a cross-sectional view of a cap carriage locked to a guiding channel and sliding across the guiding channel according to an example of the present disclosure. The cap of these figures may be the cap 20*a* of the FIGS. 2*a* and 2*b*. A cap carriage 30 supports the cap 20. The cap carriage 30 may be moved in a direction parallel to the print medium advance direction on a guide channel 50, i.e. in a direction perpendicular to the paper.

The cap 20 of these figures comprises a cap holder 21 and a cap member 22 connected to the cap holder 21 through an elastic element 23, e.g. a spring. The cap member may cover and seal the nozzles of a printhead. The cap member 22 may be moved upwards and downwards with respect to the cap holder 21 to respectively engage and disengage the printhead. When the cap member engages the printhead, the printhead is shielded from damage and ingress of contaminants may thus be prevented. In some examples, the cap member may comprise a rubber member to adapt to the shape of the printhead. The rubber member may comprise a substantially flat surface and a rim protruding from the substantially flat surface. The rim may engage a perimeter of the printhead to seal the nozzles.

The cap holder may be connected to the cap carriage. In these figures, the cap holder is snapped into a base 33 of the cap carriage 30. The cap carriage 30 of these examples comprises a bracket 31 extending towards the guide channel 50. In these figures, the positioning mechanism comprises a guiding bar 41 extending in a direction parallel to the print medium advance direction. The guiding bar 41 is parallel to the guide channel 50. The guiding bar 41 of these figures engages the bracket 33 to guide the cap carriage 30. Misalignment of the cap carriage may thus be prevented. The bracket may slide along the guiding bar. The bracket may cover the guiding bar to protect the guiding bar and the guide channel from contaminants.

In these figures, the positioning mechanism 40 comprises a locking mechanism 60 to slidably coupling the cap carriage 30 to the guide channel 50. The locking mechanism comprises a locking element 61 movable between a locking position (FIG. 3*a*) to engage the guide channel 50 to lock the cap carriage 30 to the guide channel 50 and a sliding position (FIG. 3*b*) to slide on the guide channel 50.

The bracket 31 of these figures comprises a first sidewall 34, a second sidewall 35, an upper wall 36 and a lower wall 37. The first sidewall 34 may connect the base 33 to the upper wall 36. The lower wall 37 may be connected to the upper wall 36 through the second sidewall 35. The first sidewall 34 may be parallel to the second sidewall 35 and perpendicular to the upper wall 36 and to the lower wall 37. The lower wall 37 may extend from the second sidewall 35 towards the first sidewall 34. The guiding bar 41 may be arranged between first sidewall 34 and the lower wall 37.

The upper wall 36 may comprise an opening aligned with an opening of the lower wall 37. These openings may be aligned with the guide channel. A locking element may be inserted in these openings.

In these figures, the locking element 61 comprises a pin 63 having a pin head 64 at one end and a cover 65 at the opposite end. The cover 65 may comprise an inverse T-shape with a central body and two side members. In this example, the central body may be moved up and down through the opening of the upper wall 36. The two side members of the cover may be greater than the opening of the upper wall. The two side members of the cover may contact the inner side of the upper wall to limit an upwards movement of the cover.

In these figures, a spring 62 connects an inner side of the lower wall 37 to the cover 65 attached to the pin 63. The spring 62 may surround the pin 63. As illustrated in FIG. 3*b*, a downward movement of the cover 65 compresses the spring 62 and moves the pin head down. This may cause the pin head to disengage the guiding channel 50.

In FIG. 3*a*, the pin head is secured to the guiding channel 50. The locking element may thus lock the cap carriage to the guiding channel, e.g. in a predetermined position. The pin head may comprise a width substantially similar to a width of the guiding channel. A width of the pin may be smaller than a width of the guiding channel. The spring 62 may press the cover 65 so as to contact the side members to the inner side of the upper wall 63 and to retain the pin head in place.

The cover may be downwardly pressed, e.g. by a user, to force a downward movement of the pin head to disengage the guiding channel 50. The pin may slide in a direction parallel to the print medium advance direction along the guiding channel by keeping the cover downwardly pressed. If the pressing force is released when the cap is at a cap position, the pin goes up and the pin head engage the guiding channel to lock the cap carriage. For example, the pin head may engage a receiver of the guiding channel. If the pressing force is released when the cap is out of a cap position, an upwards movement of the pin may be prevented. This may indicate that the cap is not at a cap position. The user may thus press again the cover to slide the pin to a cap position and then releasing the pressing force.

In some examples, a protective element may be to protect the cover. This may prevent from unintentionally pressing the cover to move the pin head down.

In these figures, a width of the guiding channel may downwardly increase to facilitate the locking element, e.g. the pin head of the pin, to move from a locking position to a sliding position. The guiding channel may be surrounded by a housing. The guiding channel may be connected to the capping station through the housing. For example, the housing may be screwed onto the support plate of the capping station.

Figure 4A:
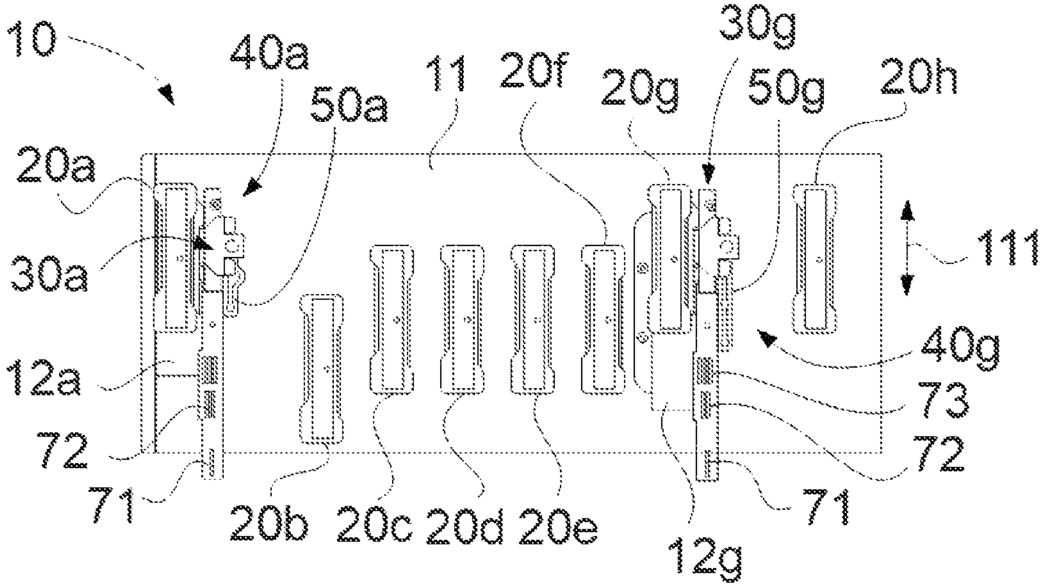
FIG. 4*a*-4*c* illustrate a capping station having caps at several positions according to an example of the present disclosure.
Figure 4B:
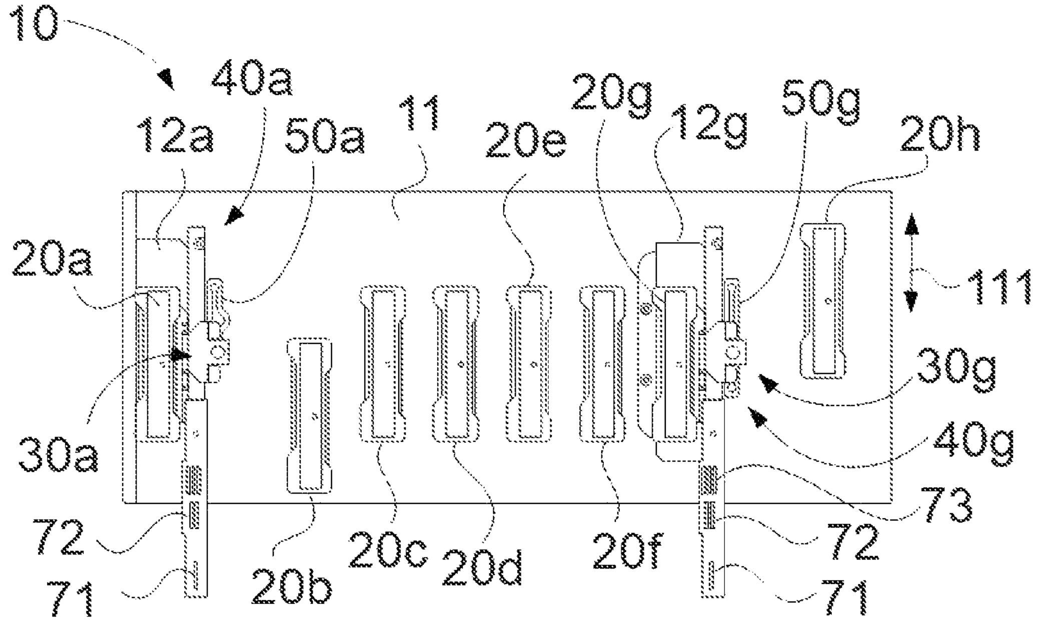
Figure 4C:
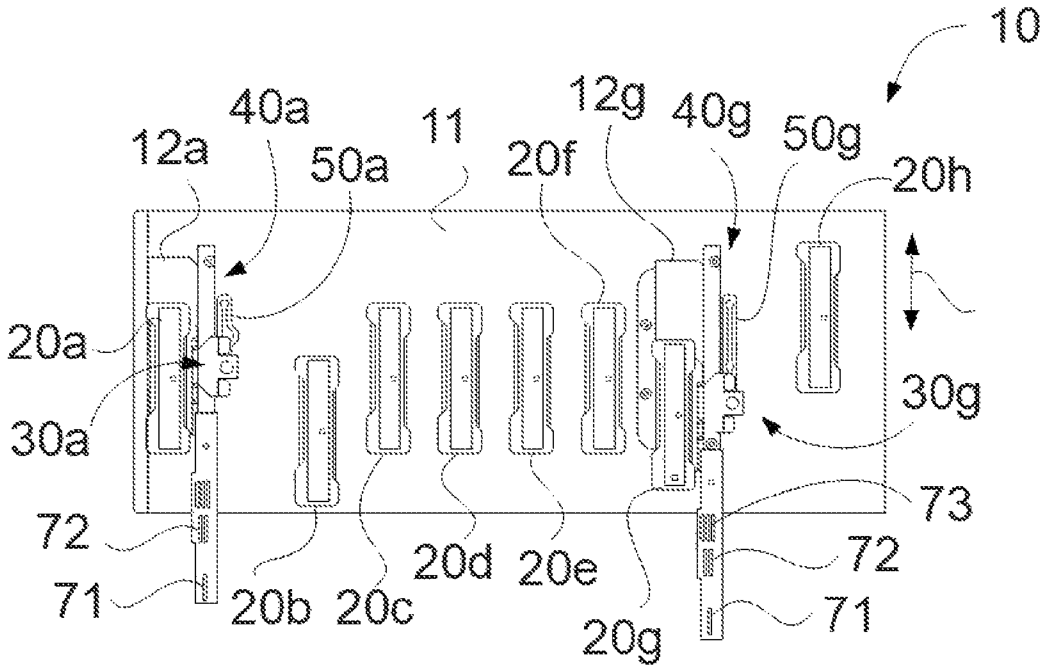

FIG. 4*a*-4*c* illustrate a capping station having caps at several positions according to an example of the present disclosure. The capping station 10 of FIG. 4*a*-4*c* comprises a plurality of caps 20*a*-*h* to seal a plurality of printheads. The caps 20*a* and 20*g* may be moved in a direction parallel to the print medium advance direction 111. The caps 20*a* and 20*g* may thus be movable or slidable caps. Caps 20*b*-*f* and 20*h* of these figures are connected to the capping station at a fixed position. The caps 20*b*-*g* and 20*h* may thus be fixed caps. For example, these fixed caps may be coupled to the capping station as explained with respect the fixed caps 20*b*-*h* of FIG. 2*a*-2*b*. The cap 20*a* may be moved across an opening 12*a* of a plate support 11 and the cap 20*g* across an opening 12*g*.

The capping station of these figures comprises a first cap carriage 30*a* supporting the cap 20*a* and a second cap carriage 30*g* supporting the cap 20*g*. The capping station may thus comprise a plurality of caps and a plurality of cap carriages, each of them supporting a cap of the plurality of caps. A cap carriage may thus be associated with each of the slidable caps. In these figures, the capping station 10 further comprises a first positioning mechanism 40*a* to slide the cap 20*a* on a first guide channel 50*a* and a second positioning mechanism 40*g* to slide the cap 20*g* on a second guide channel 50*g*. The capping station may thus comprise a plurality of caps, cap carriages and positioning mechanisms. A positioning mechanism may cause a cap carriage supporting a cap to slide on a guide channel. In some examples, a single positioning may move several cap carriages on corresponding guide channels.

The cap carriages, the guide channels and the positioning mechanisms of these figures may be according to any of the examples herein disclosed.

The positioning mechanisms 40*a* and 40*g* of these figures may move the corresponding the cap carriage 30*a* and 30*g* to slide on the corresponding guide channel 50*a* and 50*g* between a plurality of cap positions and may selectively lock these cap carriages 30*a* and 30*g* at the plurality of cap positions.

In FIG. 4*a* the cap carriages 30*a* and 30*g* are locked at a first cap position. The cap carriages 30*a* and 30*g* are locked at second cap position in FIG. 4*b*. The cap carriages 30*a* and 30*g* may thus be moved between a first cap position (FIG. 4*a*) and a second cap position (FIG. 4*b*) in a direction parallel to the print medium advance direction.

In FIG. 4*c*, the cap carriage 30*a* is locked at a second cap position as in FIG. 4*b*, however, the cap carriage 30*g* is locked at a third cap position. The second position cap position of the cap 20*g* (FIG. 4*b*) is between the first cap position of the cap 20*g* (FIG. 4*a*) and the third cap position of the cap 20*g* (FIG. 4*c*). The cap carriage 30*g* may thus slide between the first cap position and the third cap position. Or in other words, the cap carriage 30*g* may slide between the first cap position and the second cap position and between the second cap position and the third cap position. A cap carriage may thus slide between a plurality of cap positions and may be locked at a plurality of cap positions.

In some examples, a guide channel may comprise a plurality of receivers to accommodate a locking element of a locking mechanism for locking at the plurality of cap positions. For example, the guide channel 50*a* may comprise two receivers to lock the cap carriage at the first or at the second cap position, whereas the guide channel 50*g* may comprise three receivers to lock the cap carriage at the first or at the second or at third cap position.

As in FIG. 2*a*-2*b*, the cap carriages 30*a* and 30*g* may comprise a first identification feature 71 and a second identification feature 72 to respectively indicate that the cap carriage is at the first cap position or at the second cap position. In FIGS. 4*a*-4*c*, the cap carriage 30*g* further comprises a third identification feature 73 to indicate that the cap carriage 30*g* is at the third cap position. A cap carriage may thus comprise a plurality of identification features to indicate the cap position.

In some examples, the first identification feature may comprise an opening, the second identification feature two openings and the third identification feature three openings. A sensor (not shown in these figures) may detect the cap position by identifying an identification feature indicating a cap position.

The sensor may be according to any of the examples herein disclosed. For example, a single sensor mounted at a printhead support may detect the position of a plurality of caps, for example the position of the cap 20*a* and of the cap 20*g*.

In some examples, the sensor system may comprise a first optical sensor to detect the position of the cap 20*a* and a second optical sensor to detect the position of the cap 20*g*.

Figure 5:
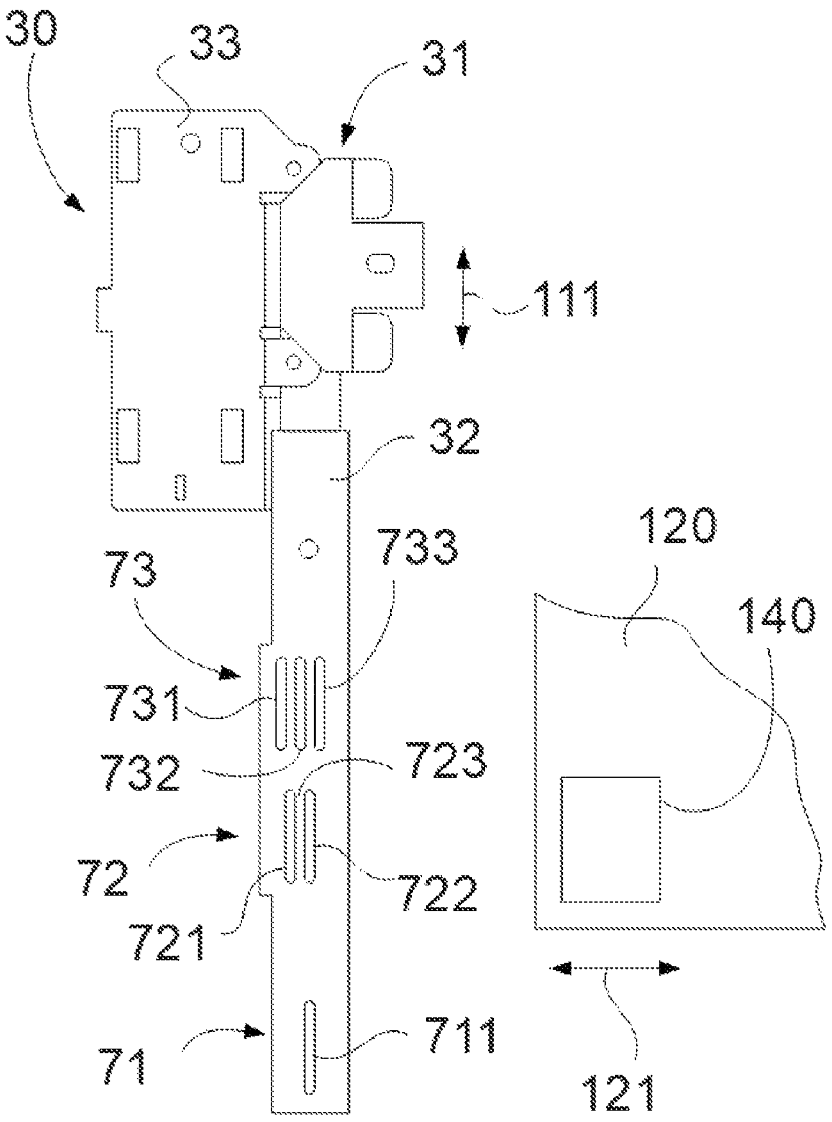
FIG. 5 illustrates a top view of a cap carriage and a sensor according to an example of the present disclosure.

FIG. 5 illustrates a top view of a cap carriage and a sensor according to an example of the present disclosure. The cap carriage 30 of this figure comprises a base 33 to receive a cap (not shown in FIG. 5) and a bracket 31. A locking mechanism may be mounted at the bracket to lock the cap carriage at a predetermined position of a guide channel (not shown in FIG. 5). The cap carriage may slide along the guide channel in a direction parallel to the print medium advance direction 111.

In this figure, the cap carriage 30 comprises a first identification feature 71 and a second identification feature 72 to respectively indicate that the cap carriage is at a first cap position or at a second cap position. The cap carriage 30 of this figure further comprises a third identification feature 73 to indicate that the cap carriage is at a third cap position. In some examples, the cap carriage may comprise further identification features to indicate further positions of the cap carriage.

In the example of this figure, the cap carriage 30 comprises a cap carriage bar 32 extending in a direction parallel to the print medium advance direction. In this example, the identification features are in the cap carriage bar 32. The cap carriage bar may be moved together with cap carriage. Accordingly, the identification features may be displaced in a direction parallel to the print medium advance direction.

The identification features may comprise openings. In some examples, the shape of the openings may be different for each identification feature.

In FIG. 5, the first identification feature 71 comprises an opening 711, the second identification feature comprises two openings 721 and 722 and the third identification feature comprises three openings 731, 732 and 733. The openings of these identification features may be elongated and may extend in a direction perpendicular to print medium advance system.

In this figure, the openings 721 and 722 of the second identification feature 72 are substantially parallel to each other. The opening 721 is spaced from the opening 722 in a direction parallel to the scan axis 121. The openings 731, 732 and 733 of the third identification feature 73 may be substantially parallel to each other and spaced in a direction parallel to the scan axis 121.

FIG. 5 also shows a sensor system 140 mounted on a printhead support 120. The printhead support of this figure is moving towards the identification features in a direction parallel to the scan axis 121. The sensor system 140 may pass over the identification features. In this example, the sensor system 140 advances towards the capping station to pass over the second identification feature 72.

The sensor system 140 of this figure comprises a line sensor. The line sensor may be used for calibrating a printhead or a plurality of printheads. The line sensor may scan print agent delivered onto a print medium to calibrate the printhead. An image created on the print medium may thus be read to compare to a pattern. For example, color of the print agent may be compared to a predetermined color. The line sensor of this figure may also be used for detecting the position of the cap.

The line sensor may comprise an emitter with a light source. The light source may comprise a led or a lamp. The light source may irradiate print agent deposited on print medium when the printing system is in a calibration process and irradiate an identification feature when the printing system is in a capping process.

The line sensor may comprise a receiver to receive light reflected back. Print medium and/or print agent may reflect back light emitted by the light source in a calibration process. A portion of the cap carriage, e.g. a cap carriage bar, may reflect back light emitted by the light source when the line sensor is above the cap carriage. In some examples, the receiver may comprise a CCD (charge-coupled device) having an array of photoelectric transduction elements.

In this example, the line sensor firstly detects the cap carriage bar when advances towards the second identification feature 72. The light source of the line sensor may irradiate the cap carriage bar and the receiver may receive light reflected back. When the light source irradiates the second opening 722 of the second identification feature, less light reflected back is received by the receiver. The line sensor may thus detect the second opening 722. When the line source is irradiating a bridge 723 between the first opening 721 and the second opening 722, an amount of light reflected towards the receiver may be increased. The amount of light reflected back received by the receiver may be reduced when the light source is irradiating the first opening 721. The first opening 721 may thus be detected. The light reflected towards the receiver may be again increased when the light source is above the cap carriage bar and finally reduced when the line sensor has exceeded the cap carriage bar. Accordingly, the line sensor may identify that has passed over the second opening and the first opening of the second identification feature. The sensor system may thus detect the second identification feature. As the second identification feature is associated with the second cap position, a second cap position may thus be detected.

Figure 6:
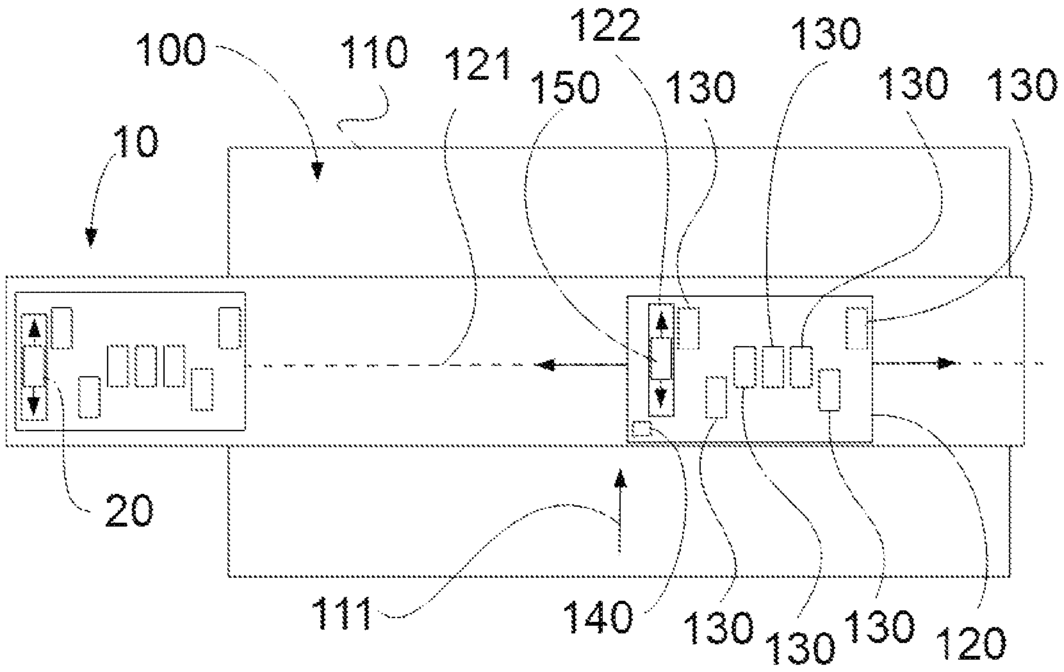
FIG. 6 schematically illustrates a printing system according to an example of the present disclosure.

FIG. 6 schematically illustrates a printing system according to an example of the present disclosure. The printing system 100 comprises a print medium advance system (not shown in FIG. 6) to transport a print medium 110 in a print medium advance direction 111, a slidable printhead 150 having a plurality of nozzles to deliver a print agent onto the print medium 110, a printhead support 120 to selectively support the slidable printhead 150 at a plurality of printhead positions including a first printhead position and a second printhead position, wherein the first printhead position and the second printhead position are spaced in a direction parallel to the print medium advance direction 111. The printing system 100 further comprises a capping station 10 having a cap 20 to seal the slidable printhead 150 and a positioning mechanism 40 to move the cap to a first cap position when the slidable printhead 150 is at the first printhead position and to a second cap position when the slidable printhead 140 is at the second printhead position. In addition, the printing system 100 comprises a sensor system 140 mounted at the printhead support 120 to detect the position of the cap 20.

The printing system 100 of FIG. 6 may be similar to the printing system of FIG. 1. However, the printing system of FIG. 6 comprises a slidable printhead. In addition to the slidable printhead 150, the printing system 100 of this figure comprises a plurality of printheads 130 fixedly connected to the printhead support. The printhead support 120 may thus support a slidable printhead 150 and a fixed printhead 130. In some examples, a printhead support may support a plurality of slidable printheads 150 and/or a plurality of fixed printheads 130.

Accordingly, a slidable printhead may deliver print agent onto a print medium at different positions in a direction parallel to the print medium advance direction 111. For example, a slidable printhead may be positioned downstream or upstream to other printheads (slidable or fixed) depending on printing circumstances. An upstream printhead may deliver print agent on a print medium and downstream printhead may deliver print agent over a previously deposited print agent. An image on a print medium may thus comprise several layers of print agent delivered by different printheads.

Moving a printhead in a direction parallel to the print medium advance direction may provide a more compact and versatile design. Space and weight of the printhead support may thus be reduced. This may involve a cost reduction in the printhead support and in driving systems moving the printhead support.

In this figure, the printhead support 120 comprises an opening 122. The slidable printhead 150 may slide along the opening 122 in a direction parallel to the print medium advance direction 111. The opening 122 may comprise a plurality of receivers to accommodate the slidable printhead 150 at a plurality of printhead positions.

In some examples, the slidable printhead may comprise a fixing system to fix the slidable printhead to the printhead support. In some examples, the printhead support may comprise a slidable printhead structure supporting the slidable support. The slidable printhead structure may slide together with the slidable printhead relative to the printhead support. In some examples, a user may select a printhead position from a plurality of printhead positions. For example, a user may move the slidable printhead from a first printhead position to a second printhead position and may lock the slidable printhead at the second printhead position.

In some examples, the slidable printhead structure may be similar to the cap carriage according to any of the examples herein disclosed.

In some examples, the printhead support may comprise a positioning mechanism to displace the slidable printhead structure relative to the printhead support. The positioning mechanism of the printhead support may be similar to any of the examples of a positioning mechanism of a capping station herein disclosed.

The capping station 10 of this figure may be according to any of the examples herein disclosed. For example, the capping station may comprise a movable cap and a fixed cap. The movable cap may be mounted at a cap carriage to be moved on a guide channel and fixed a predetermined position by a positioning mechanism. The movable cap, the cap carriage, the positioning mechanism and the guide channel may be according to any of the examples herein disclosed.

The capping station may comprise a plurality of identification features to be identified by the sensor to detect the position of the cap. The plurality of identification features may be according to any of the examples herein disclosed. For example, the plurality of identification features may comprise a first identification feature associated with the first cap position and a second identification feature associated with the second cap position. The first identification feature may comprise an opening and the second identification feature may comprise a pair of openings.

The sensor system of this figure may be according to any of the examples of sensor systems mounted on a printhead support herein disclosed. For example, the sensor system may comprise a line sensor. A line sensor may read an image created on a print medium. The line sensor may be used to calibrate the printing system. Accordingly, a single sensor may be used for different aspects. Costs of the printing system may thus be reduced.

The line sensor may comprise an emitter with a light sourced to selectively irradiate print agent on a print medium and the plurality of identification features and a receiver to receive light reflected back.

In some examples, the printing system may comprise a controller to receive data from the sensor system and to determine the position of the cap or of the plurality of caps. The controller may determine the position of a slidable printhead or of a plurality of slidable printheads. In some examples, the controller may further control the operation of the printing system. The controller may include a processor and a non-transitory machine-readable storage medium. The non-transitory machine-readable storage medium may be coupled to the processor.

The processor performs operations on data. In an example, the processor is an application specific processor, for example a processor dedicated to control the capping station. The processor may also be a central processing unit.

The non-transitory machine-readable storage medium may include any electronic, magnetic, optical, or other physical storage device that stores executable instructions. The non-transitory machine-readable storage medium may be, for example, Random Access Memory (RAM), an Electrically Erasable Programmable Read-Only Memory (EEPROM), a storage drive, an optical disk, and the like.

In some examples, the controller may be used to perform a method to cap a printhead of a printing system according to any of the examples herein disclosed.

Figure 7:
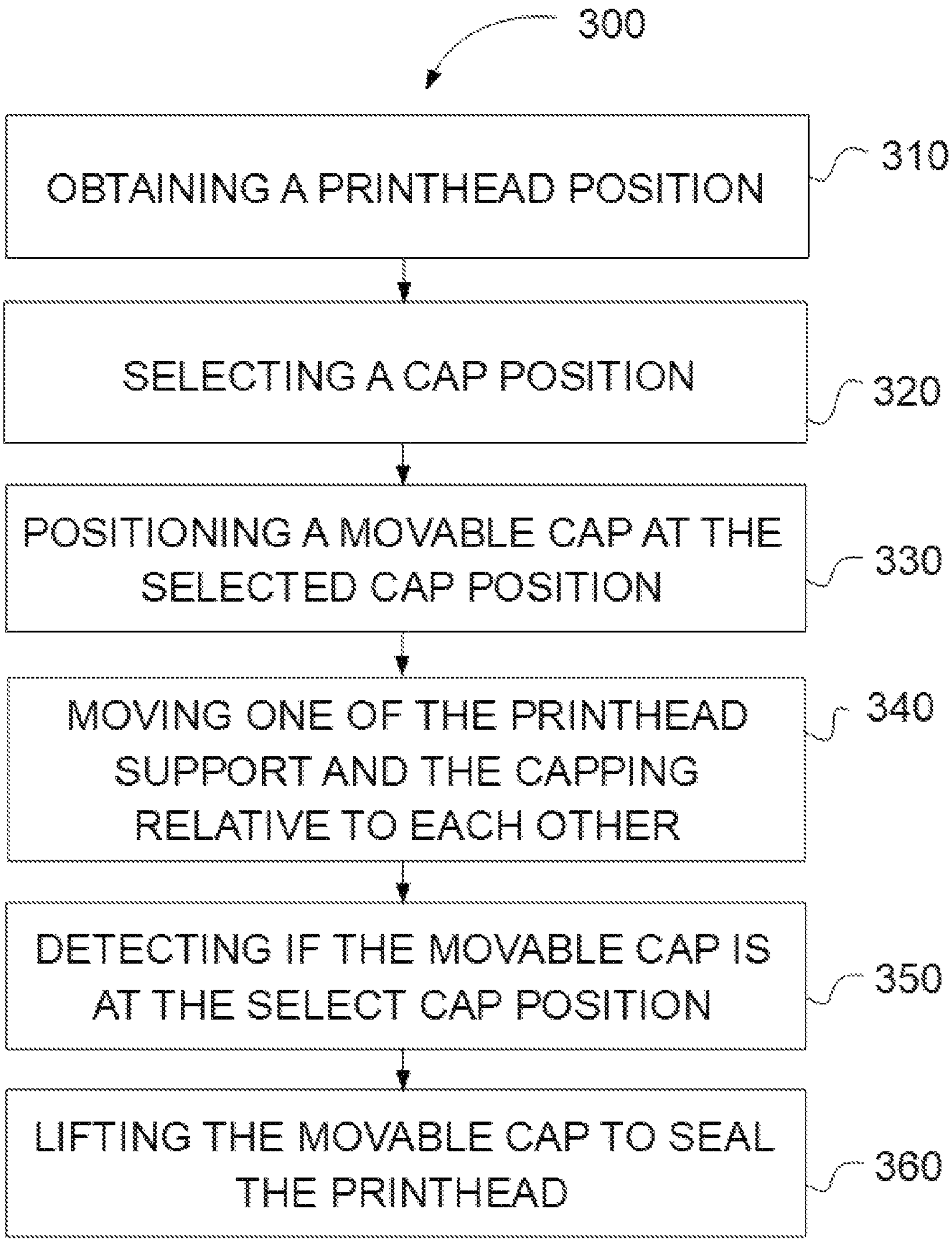
FIG. 7 is a block diagram of an example of a method to cap a printhead of a printing system according to an example of the present disclosure.

FIG. 7 is a block diagram of an example of a method to cap a printhead of a printing system according to an example of the present disclosure. The method 300 to cap a printhead of a printing system comprises obtaining a printhead position from a plurality of predetermined printhead positions of a printhead support as represented at block 310 and selecting a cap position from a plurality of predetermined cap positions of a capping station based on the obtained printhead position as represented at block 320. At block 330 positioning a movable cap at the selected cap position is represented and moving one of the printhead support and the capping station relative to each other to position the printhead above the capping station is represented at block 340. Block 350 represents detecting if the movable cap is at the selected cap position. Lifting the movable cap to seal the printhead when the movable cap is detected at the selected cap position is represented at block 360.

The position of a movable cap may be adjusted to a position of a printhead to seal this printhead. Accordingly, a cap system may be used for sealing a printhead adopting several positions. In this method, the printing system may be according to any of the examples herein disclosed.

In some examples, a printhead position may be obtained from a sensor. In one example, the sensor may be an optical sensor. In one example, the sensor may be a mechanical sensor associated with each of the predetermined printhead positions. Data received by the sensor may be received by a controller.

In some examples, a user interface device may receive an input of a user indicating the position of the printhead. The user interface device may be connected to a controller to obtain the printhead position.

In some examples, the printhead may be movable in a direction parallel to the print medium advance direction. A user may displace the printhead between different positions within the printhead support.

Depending on the obtained printhead position a cap position from a predetermined cap positions of a capping station may be selected. In some examples, a controller may determine which cap position correspond to the obtained printhead position. In some examples, a user may select a cap position. In some examples, the printhead support and the capping station may comprise indicating marks to respectively indicate the position of the printhead support and the capping station.

In some examples, positioning the movable cap at the selected cap position as represented at block 330 may comprise sliding a cap carriage supporting the movable cap on a guide channel to the selected cap position. The cap carriage may slide on the guide channel according to any of the examples herein disclosed. In some examples, a user may move the cap carriage across the guide channel. In some examples, a driving mechanism may displace the cap carriage within the guide channel.

In some examples, positioning the movable cap at the selected cap position as represented at block 330 may comprise locking a cap carriage supporting the movable cap at the selected cap position. The cap carriage may be locked to a guide channel.

A locking mechanism may be used for locking the cap carriage to the guide channel. The locking mechanism may comprise a locking element movable between a locking position to engage the guide channel to lock the cap carriage to the guide channel and a sliding position to slide on the guide channel. A user may move the locking element between a locking position and a sliding position. For example, a user may press the locking element to shift from a locking position to a sliding position. A user may release a pressure exerted onto the locking element to lock the cap carriage to the guide channel, e.g. to insert a locking element into a receiver of the guide channel.

In some examples, a displacing member may relative move one of the printhead support and the capping station to the other of the printhead support and the capping station to position the printhead above the capping station, e.g. the movable cap.

In some examples, moving 340 one of the printhead support and the capping station relative to each other to position the printhead above the capping station comprises moving the printhead support in a scan axis towards the capping station. The printhead support may comprise a carriage moving the printhead across the scan axis towards the capping station. A printhead support of a scan-axis printing system may thus move the printhead towards the cap.

In some examples, the displacing member may move the capping station towards the printhead support to align a cap and a printhead. In page-wide array printer systems, the capping station may be moved towards the print bar. For example, the print bar may be retracted from a print zone and the capping station may rotate towards the print bar in the retracted position.

In some examples, detecting if the movable cap is at the selected cap position may be during moving the printhead support towards capping station. As explained with respect to FIG. 5, a sensor mounted on the printhead support may identify an identification feature associated with the cap position when the printhead support is moving in the scan axis to position the printhead above the capping station, e.g. above the movable cap.

In some examples, for example wherein the sensor is at the capping station, detecting if the movable cap is at the selected cap position may be performed before moving one of the printhead support and the capping station relative to each other.

In some examples, detecting 350 if the movable cap is at the selected cap position may comprise identifying an identification feature from a plurality of identification features, wherein the plurality of identification features is associated with the plurality of predetermined cap positions. In some examples, identifying an identification feature from a plurality of identification features may comprise irradiating the identification feature with a light source. In some examples, identifying an identification feature from a plurality of identification features may comprise comparing an amount of light reflected back by the identification feature to an amount of light reflected back by a portion of a cap carriage having the plurality of identification features.

After detecting that the movable cap is at the selected cap position, the movable cap may be lifted to seal the printhead. A lifting system may lift the movable cap towards the printhead.

In some examples, the capping station may comprise a plurality of caps, for example having movable and fixed caps. The lifting system may lift the plurality of caps to seal the corresponding printheads.

The preceding description has been presented to illustrate and describe certain examples. Different sets of examples have been described; these may be applied individually or in combination, sometimes with a synergetic effect. This description is not intended to be exhaustive or to limit these principles to any precise form disclosed. Many modifications and variations are possible in light of the above teaching. It is to be understood that any feature described in relation to any one example may be used alone, or in combination with other features described, and may also be used in combination with any features of any other of the examples, or any combination of any.

The invention claimed is:

1. A capping station for a printing system comprising:

a cap to seal a printhead;

a cap carriage to support the cap, wherein the cap carriage comprises a first identification feature and a second identification feature to respectively indicate that the cap carriage is at a first cap position or at a second cap position; and a positioning mechanism to slide the cap carriage on a guide channel between the first cap position and the second cap position in a direction parallel to a print medium advance direction and to selectively lock the cap carriage at the first cap position or at the second cap position.

2. The capping station according to claim 1, wherein the positioning mechanism comprises a locking mechanism to slidably coupling the cap carriage to the guide channel.

3. The capping station according to claim 2, wherein the locking mechanism comprises a locking element movable between a locking position to engage the guide channel to lock the cap carriage to the guide channel and a sliding position to slide on the guide channel.

4. The capping station according to claim 1, wherein the cap carriage comprises a bracket and the positioning mechanism comprises a guiding bar extending in a direction parallel to the print medium advance direction engaging the bracket to guide the cap carriage.

5. The capping station according to claim 1, wherein the cap carriage comprises a cap carriage bar extending in a direction parallel to the print medium advance direction and wherein the cap carriage bar comprises the first identification feature and the second identification feature.

6. A printing system comprising:

a print medium advance system to transport a print medium in a print medium advance direction, a slidable printhead having a plurality of nozzles to deliver a print agent onto the print medium;

a printhead support to selectively support the slidable printhead at a plurality of printhead positions including a first printhead position and a second printhead position, wherein the first printhead position and the second printhead position are spaced in a direction parallel to the print medium advance direction;

a capping station comprising:

a cap to seal the slidable printhead;

a positioning mechanism to move the cap to a first cap position when the slidable printhead is at the first printhead position and to a second cap position when the slidable printhead is at the second printhead position; and a plurality of identification features comprises a first identification feature associated with the first cap position and a second identification feature associated with the second cap position; and a sensor system mounted at the printhead support to detect the position of the cap.

7. The printing system according to claim 6, wherein the plurality of identification features are to be identified by the sensor to detect the position of the cap.

8. The printing system according to claim 6, wherein the first identification feature comprises an opening and the second identification feature comprises a pair of openings, wherein the first identification feature comprises an opening and the second identification feature comprises a pair of openings.

9. The printing system according to claim 6, wherein the sensor system comprises a line sensor.

10. The printing system according to claim 9, wherein the line sensor comprises an emitter with a light source to selectively irradiate print agent deposited on a print medium and the plurality of identification features and a receiver to receive light reflected back.

11. A method to cap a printhead of a printing system:

obtaining a printhead position from a plurality of predetermined printhead positions of a printhead support;

selecting a cap position from a plurality of predetermined cap positions of a capping station based on the obtained printhead position;

positioning a movable cap at the selected cap position;

moving one of the printhead support and the capping station relative to each other to position the printhead above the capping station;

detecting if the movable cap is at the selected cap position; and lifting the movable cap to seal the printhead when the movable cap is detected at the selected cap position, wherein the detecting if the movable cap is at the selected cap position comprises identifying an identification feature from a plurality of identification features, wherein the plurality of identification features is associated with the plurality of predetermined cap positions.

12. The method according to claim 11, wherein positioning the movable cap at the selected cap position comprises sliding a cap carriage supporting the movable cap on a guide channel to the selected cap position.

13. The method according to claim 11, wherein positioning the movable cap at the selected cap position comprises locking a cap carriage supporting the movable cap at the selected cap position.

14. The method according to claim 11, wherein moving one of the printhead support and the capping station relative to each other to position the printhead above the movable cap comprises moving the printhead support in a scan axis of the printing system towards the capping station.

* * * * *